United States Patent [19]
Beisch et al.

[11] 4,178,043
[45] Dec. 11, 1979

[54] SIMULATED WIRE WHEEL TRIM FOR AUTOMOTIVE WHEELS

[75] Inventors: Hans R. Beisch, Amherstburg, Canada; Frederick A. Apczynski, Livonia; James E. Gillespie, Westland, both of Mich.

[73] Assignee: Norris Industries, Inc., Ypsilanti, Mich.

[21] Appl. No.: 817,628

[22] Filed: Jul. 21, 1977

Related U.S. Application Data

[63] Continuation-in-part of Ser. No. 708,439, Jul. 26, 1976, abandoned.

[51] Int. Cl.² ............................................. B60B 7/00
[52] U.S. Cl. ........................... 301/37 SS; 301/37 CM
[58] Field of Search ............ 301/37 R, 37 P, 37 CM, 301/37 SS, 37 L, 104; 29/159 A, 159.01; 24/73 HC

[56] References Cited

U.S. PATENT DOCUMENTS

| | | | |
|---|---|---|---|
| 2,711,349 | 6/1955 | Groven | 301/37 SS |
| 2,792,261 | 5/1957 | Tell et al. | 301/37 SS |
| 3,174,803 | 3/1965 | Mulhern et al. | 301/37 CM |
| 3,843,201 | 10/1974 | Buerger | 301/37 SS |
| 4,009,911 | 3/1977 | Apczynski | 301/37 SS |

Primary Examiner—Robert J. Spar
Assistant Examiner—H. Grant Skaggs
Attorney, Agent, or Firm—Harness, Dickey & Pierce

[57] ABSTRACT

There is disclosed herein a simulated wire wheel cover having a construction which allows for the reduction of the number of separate parts required in the fabrication of such wheel covers and, further, also reduces the total weight of such wheel covers. This simulated wire wheel comprises a generally round base member having an irregular cross-sectional shape and retention system affixed to the outer periphery thereof which is adapted to engage a conventional vehicle safety wheel rim. An axially elongated center hub member is adapted to be coaxially positioned over the axially outer surface of this base member and is adapted to secure the radially inner ends of a plurality of spokes radiating outward from its axially inner end. A cap member is disposed over this hub member and is adapted to clamp a second plurality of spokes extending radially outward from the axially outer end of the hub member. A single ring of fasteners secures this cap member to the base member in such a manner as to exert a clamping force which is transmitted from the cap member to the center hub member and therethrough to the base member. Thus, the simulated wire wheel construction of the present invention provides a system by which a plurality of spokes extending radially outward from two axially spaced apart locations of a center hub member may be clamped through the agency of a single ring of fasteners. Also, the present invention may be fabricated with hollow spoke members thereby further reducing the overall weight thereof.

25 Claims, 7 Drawing Figures

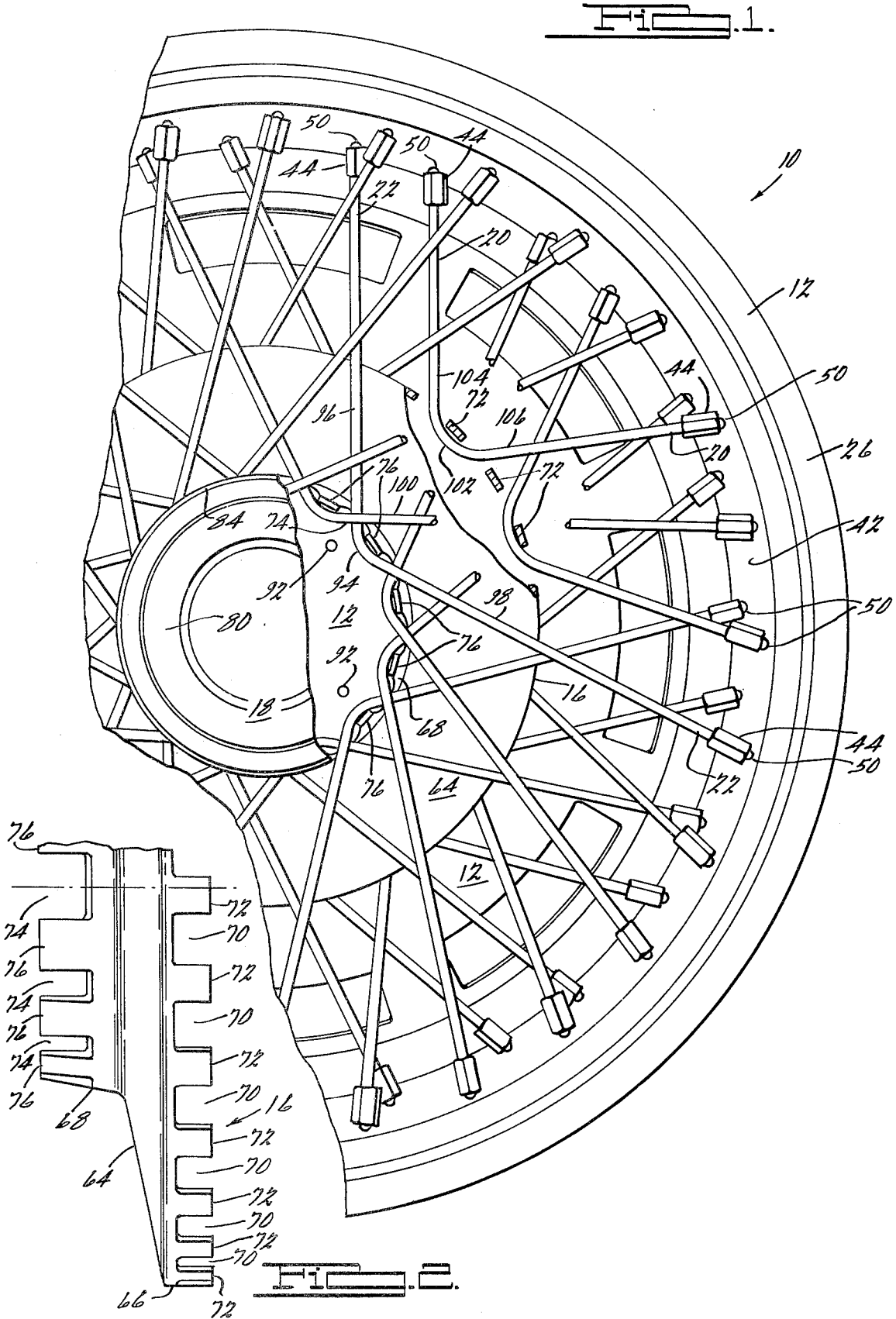

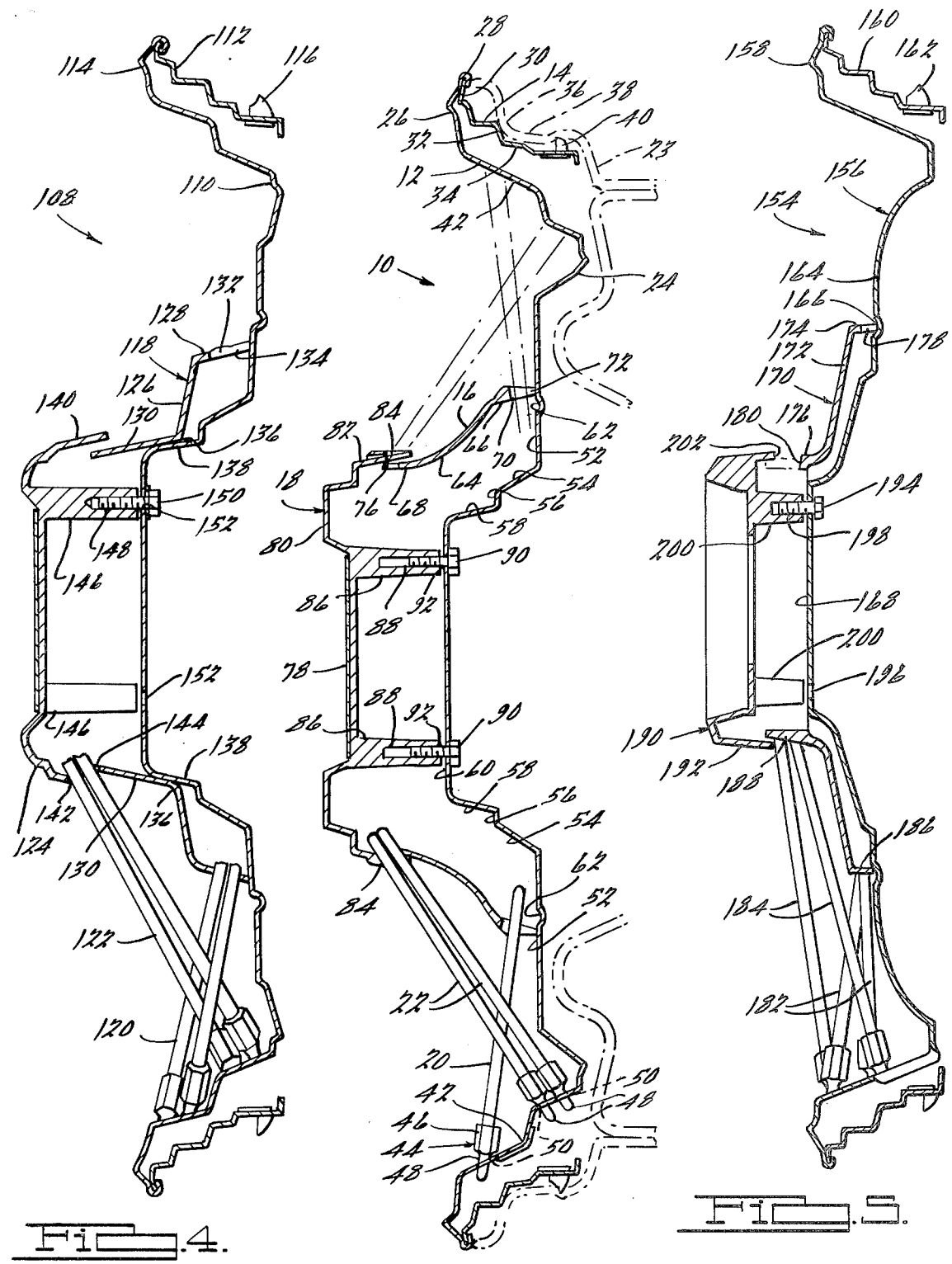

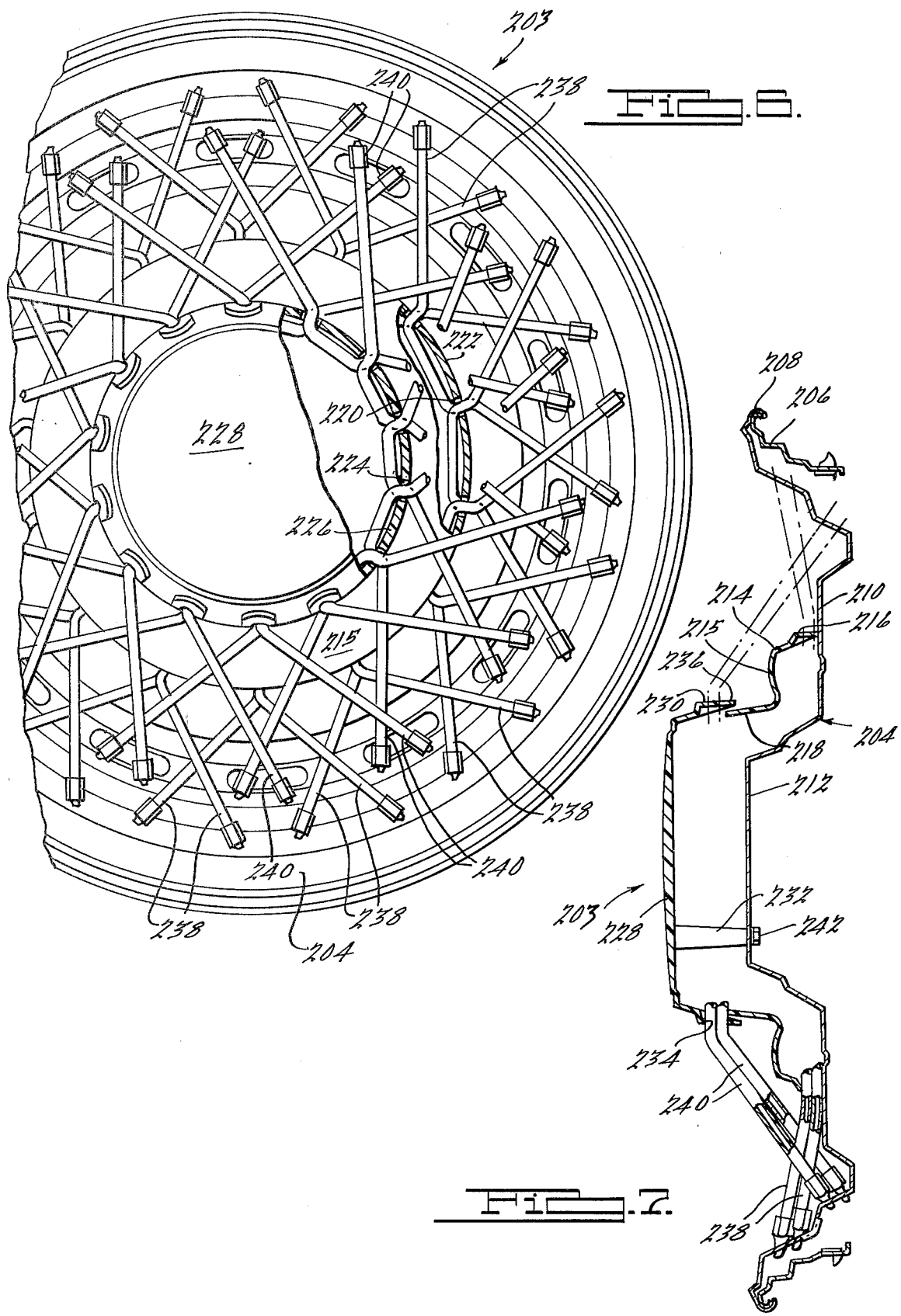

SIMULATED WIRE WHEEL TRIM FOR AUTOMOTIVE WHEELS

This application is a continuation-in-part of application Ser. No. 708,439 filed July 26, 1976, now abandoned.

BACKGROUND AND SUMMARY OF THE INVENTION

The present invention relates generally to simulated wire wheel constructions and more specifically to a means by which such wheel covers having spokes radiating outwardly from two axial spaced apart center positioned may be fabricated using a single ring of fasteners.

Ever since the advent of the automobile, wire wheels have held a special attraction as providing an aesthetically pleasing decorative trim to the vehicle. As vehicle weights and the speeds at which they may be driven began to increase, the structurally weak authentic wire wheels were gradually replaced by simulated wire wheel covers for use on the stronger steel flange-type wheels. These simulated wire wheel trim members have evolved to the present state where such wheel trims provide a remarkably authentic appearance which contributes significantly to the vehicle aesthetics.

In order to achieve this authentic appearance in a simulated wire wheel trim member, it is generally desirable to provide two groups of spoke member radiating outward from two axial spaced apart locations of a central hub member and having their radially outer ends secured to a generally axially extending flange member. The problem then becomes how to securely fasten the axially spaced apart radially inner end portions of these spoke members in a manner which affords a secure rattle-free assembly and at the same time minimizes both the manufacturing costs and weight of such wheel covers.

Numerous structural arrangements have been employed in attemping to provide a satisfactory solution to this problem. One such method consists of separately fastening each individual inner spoke member to a base member and then securing a cap member to the base member to clamp a group of outer spoke members. Such a method not only requires extensive assembly time, but also requires a large number of fasteners, both factors which substantially increase the cost of manufacturing such wheel covers.

Another method involves forming a number of disc-like members, each having a round center portion, an annular flange portion, and a plurality of integrally formed sheel metal spoke-like arms extending therebetween. The disc members are then secured at the outer peripheral edge by crimping the various members together and at the center by a group of screw fasteners which also secure an ornamental cap member thereto. While these wheel covers are relatively inexpensive to assemble, the use of these sheet metal spoke members detracts from the authentic appearance thereof. Further, such constructions also lack structural strength as the sheet metal spoke members may easily become bent thereby allowing adjacent members to produce annoying rattling or buzzing noise vibrations.

Still another method utilizes a base member in the shape of a ring having inner and outer center hub members engaging opposite sides of the inner edge of the base member so as to clamp a first group of spoke members adjacent thereto. A cap member is secured to a top portion of the inner hub member and overlaps the outer hub member so as to clamp a second group of spoke members therebetween. This method reduces the number of fastening devices required but replaces them with an additional structural element in the form of the inner hub member requiring additional assembly. Further, the additional material, forming operations and inventory requirements required by this additional part serves to increase the cost of manufacturing such a wheel cover.

Another method, which eliminates the disadvantages mentioned with respect to the immediately preceding method, employs first and second rings of screw fasteners in place of the inner hub member, having a first ring of screw fasteners clamping the base member and outer hub members together and thereby securing a first group of spoke members therebetween and a second ring of screw fasteners clamping a cap member to the outer hub member thereby clamping an outer group of spoke members therebetween. Such constructions, therefore, require that two complete rings of fastening devices be provided as well as both a cap member and an outer hub member having provisions thereon for receiving such fastening devices. Such an arrangement makes the construction of realistic appearing simulated wire wheel covers relatively expensive, and further substantially increases the weight of such wheel covers. Thus, not only do such wheel covers require a substantial amount of time in the assembly operation, but also require substantial machining and forming operations to incorporate separate provisions for each of these rings of fastening means, both factors of which contribute to significantly increased production cost.

Accordingly, the present invention provides a construction having a remarkably authentic appearance which eliminates this outer ring of fasteners, using but a single inner ring of fasteners which engage a base member and a cap member in such a manner as to clamp a center hub member therebetween. The center hub member has provisions for receiving the radially inner ends of both groups of spokes in such a manner as to securely retain them in position when assembled to the base and cap members. Thus, the present invention offers the advantage of reduced material costs and weight in that reinforcings for the attachment of only a single ring of fastening devices need be provided as well as also greatly reducing the assembly time in that substantially fewer fastening devices need be installed. Also, additional reductions in weight may be achieved by use of hollow spoke members if desired.

Additional features and advantages of the present invention will become apparent from the subsequent description and the appended claims taken in conjunction with the accompanying drawings.

BRIEF DESCRIPTION OF THE DRAWINGS

FIG. 1 is a view of a portion of a simulated wire wheel cover in accordance with the present invention as viewed when looking in an axially inward direction and having portions thereof partially broken away;

FIG. 2. is an edge view of the center hub member of the present invention;

FIG. 3 is a sectional view of a simulated wire wheel cover of the present invention having a portion of the spokes removed therefrom, the section being taken along a radial plane passing through the rotational axis of the wheel;

FIG. 4 is a view similar to that of FIG. 3, but illustrating an alternative embodiment of the present invention;

FIG. 5 is also a sectional view similar to that of FIGS. 3 and 4 but illustrating yet another embodiment of the present invention;

FIG. 6 is a view of a portion of a simulated wire wheel cover in accordance with the present invention similar to that of FIG. 1 and also having portions thereof broken away; and FIG. 7 is a sectional view similar to that of FIGS. 3 through 5 but illustrating yet another embodiment of the present invention.

DESCRIPTION OF THE PREFERRED EMBODIMENT

Referring now to FIGS. 1 through 3, there is illustrated a simulated wire wheel cover of the present invention indicated generally at 10. Wheel cover 10 is comprised of a base member 12, a retention band 14 secured to the periphery of base member 12, a center hub member 16, a cap member 18, and a plurality of inner and outer spoke members 20 and 22 respectively.

Base member 12 is circular in shape and of a sufficient diameter to substantially cover the outer peripheral edge of a vehicle wheel 23 (illustrated in phantom in FIG. 3) to which it is to be fitted and has a variable irregular radially symetrical contour which may be adapted to be fitted to any desired vehicle wheel having varying configurations of raised and depressed portions. The varying contour of base member 12 will be adapted to provide clearance between the axially inner surface 24 thereof and the wheel rim to which it is to be fitted so as to prevent the generation of noise vibrations.

As best seen in FIGS. 1 and 3, base member 12 is provided with a generally radially extending flange portion 26 having a peripheral edge portion 28 which is crimped or otherwise folded over a mating radially extending flange portion 30 provided on retention band 14 so as to secure them in a fixed mutual engagement.

Retention band 14 may have any cross sectional contour desired, but will generally include radial and axial flange portions 32 and 34 respectively which engage respective radial and axial flange portions 36 and 38 of wheel 23 so as to ensure accurate positioning of the wheel cover with respect to the wheel on which it is installed. Additionally, retention band 14 will also be provided with a plurality of tooth members 40 projecting radially outward therefrom and adapted to engage a portion of vehicle wheel 23 in a biting relationship so as to retain wheel cover 10 in an installed relationship thereto. These tooth members 40 may be either separate members securely fastened to retention band 14 such as by rivets, welding, or by any other suitable means or alternatively may be integrally formed thereon.

While each of the preferred embodiments illustrated herein utilize retention bands having separate toothed members secured thereto, any other suitable retention means may be easily substituted therefor, such as for example, a plurality of retaining clip members secured to base member 12 or base member 12 may be formed with a retention band integral thereto should this be desirable.

In any event, base member 12 will also be provided with a generally radially and axially inward extending flange portion 42 which provides a support for the radially outer terminal ends of inner and outer spoke members 20 and 22 respectively. The terminal end portions of each of spoke members 20 and 22 are provided with simulated nuts 44 which have a hexagonal portion 46 formed thereon to further the authentic appearance of the wheel cover, and a cylindrical end portion 48 passing through apertures 50 provided in flange portion 42 of base member 12. Apertures 50 will generally be equally spaced apart around the circumference of flange portion 42 and are positioned in two axially spaced apart rows with the terminal end portions of both inner and outer spokes 20 and 22 alternating between these axially inner and outer apertures so as to create a criss-cross effect also enhancing the realistic appearance of the wheel cover.

Disposed radially inward from flange portion 42, base member 12 has a relatively wide flat radially extending flange portion 52 terminating radially inward at a generally radially inward and axially outward extending flange portion 54, and having an annular indentation 62 provided therein approximately intermediate the width thereof. Flange portion 54 is substantially narrower than flange portion 52 and terminates at a radially inward extending lip portion 56. A generally axially outward extending flange portion 58 extends between the radially inner edge of lip 56 and a raised relatively flat continuous center portion 60.

Base member 12 will preferably be fabricated from a relatively thin gauge sheet metal by stamping or otherwise forming to the desired contour and have exposed portions thereof appropriately finished. A particularly appealing appearance may be created by polishing the outer flange portions thereof and applying a black satin finish behind the spoke members.

Center hub member 16, best seen and described with reference to FIGS. 2 and 3, has a generally conical radially inward and axially outward extending central portion 64 terminating at opposite ends thereof in generally axially inwardly and outwardly extending flange portions 66 and 68 respectively. Axially inwardly extending flange portion 66 has a plurality of equally spaced apart rectangular shaped slots 70 provided around the circumference thereof and which are separated by tab portion 72. Slots 70 are adapted to allow center hub member 16 to be placed over the radially inner end of inner spoke members 20. Similarly, axially outwardly facing flange portion 68 also has a plurality of equally spaced apart generally rectangular shaped slots 74 and separated by tab portions 76 provided around the circumference thereof. Slots 74 are adapted to receive the radially inner end portions of outer spoke members 22. Central portion 64 of hub member 16 may be shaped in any desired manner to provide an aesthetically pleasing appearance and will generally be finished so as to provide a bright shiny appearance, such as by chrome plating and polishing of the outwardly facing surfaces thereof. It is anticipated that central hub member 16 will be cast from a suitable metal and finished by chrome plating and polishing of the outwardly facing surfaces thereof, however, it should be noted that hub member 16 could also be easily fabricated by any other suitable forming means and alternatively could be fabricated from a plastic composition if so desired.

Cap member 18 is generally round in shape and has a central recessed portion 78 provided therein in which a suitable medallion or other desired ornamentation may be secured in any suitable manner such as by gluing for example. A raised annular shoulder portion 80 surrounds this recessed center portion 78 and serves to provide a frame surrounding and accenting the center ornamentation. An axially inward projecting annular flange portion 82 extends from shoulder portion 80 projecting slightly radially outward and has an inside diameter slightly greater than the outside diameter of flange portion 68 so as to allow cap member 18 to fit over axially outward projecting tab portions 76 of center hub member 16. Flange portion 82 also has a plurality of equally spaced apart shallow slots 84 provided therein having a width corresponding to the width of slots 74 in flange portion 68 of hub member 16 so as to be able to mesh therewith thereby surrounding outer spoke member 22. A plurality of cylindrical shaped spaced apart projections 86 extend axially inward from the central recessed portion 78 of cap member 18 and have threaded apertures 88 provided therein adapted to receive screw fasteners 90 which extend through apertures 92 provided in center portion 60 of base member 12 so as to allow cap member 18 to be securely fastened to base member 12.

As best seen with reference to FIG. 1, outer spoke members 22 are fabricated from relatively long lengths of rod or wire formed into a generally "V" shape having a rounded radially inward disposed portion 94 and a pair of spaced apart radially outward extending leg portions 96 and 98. Leg portion 96 has a simulated nut 44 provided on its radially outer end as previously mentioned and is supported in one of the apertures 50 provided in flange portion 42 of base member 12. Similarly, leg portion 98 extends radially outward, has a simulated nut 44 provided on its terminal end and is supported in another one of the apertures 50 provided in flange portion 42 of base member 12. In the particular embodiment illustrated in FIG. 1, leg 96 of outer spoke member 22 is disposed in one of the axially inwardly disposed apertures provided in flange portion while leg 98 thereof is disposed in one of the axially outwardly disposed apertures. This arrangement allows both leg 96 of outer spoke 22 and another leg 100 of an adjacent similarly shaped outer spoke 22 to pass through a single slot 74 provided in hub member 16 in an overlapping or crossed relationship with each tab portion 76 having a rounded portion 94 of spoke member 22 passing around the radially inner edge thereof.

Inner spoke members are similary fabricated from suitable lengths of rod or wire formed into a generally "V" shape and having rounded radially inner portion 102 curving around the radially inner edge of tab portions 72 and having a pair of radially outwardly extending leg portions 104 and 106 each of which has a simulated nut 44 provided on the radially outward end thereof and is supported in respective ones of apertures 50 provided in flange portion 42 of base member 12. It will be noted that legs 104 and 106 of inner spoke members 20 are substantially shorter than legs 96 and 98 of outer spoke member 22 and that the radially inner rounded end portions 102 and 94 of inner and outer spoke members are each equally spaced apart from each other along the circumference of respective axially spaced apart circles, the circle defined by rounded end portions 102 of inner spoke member 20 being of a substantially greater diameter than the circle defined by rounded end portions 94 of outer spoke members 22.

Wheel cover 10 is assembled by first installing simulated nuts 44 on each of the end portions of inner spoke members 20. Next, one leg 104 of each inner spoke member 20 is inserted in every other aperture 50 of the inner row of apertures 50 provided in flange portion 42 of base member 12. Similarly, leg 106 is placed in every other one of the axially outer row of apertures 50 provided in base member 12. This procedure is repeated until all the inner spoke members 20 have been properly installed in position. It will be noted that legs 106 of each inner spoke member 22 will overlie a leg 104 of the next adjacent inner spoke member 20, thus creating a realistic appearing criss-cross network of inner spoke members.

Next, center hub member 16 is positioned over inner spoke members 20 with each leg of inner spoke members 20 passing radially outward through one of the plurality of slots 70 provided in flange portion 66 of hub member 16. Slots 70 will be of a sufficient depth and width to allow spoke members 20 to pass therethrough but prevent relative rotation of hub member 16 with respect to base member 12. Further, as apertures 50 are generally round and have an axis perpendicular to the surface of flange 42, inner spoke members 20 will initially project axially outwardly so as to be perpendicular to this surface. Thus, tab portions 72 will be spaced away from flange portion 52 by inner spoke members 20 at this stage of the assembly process.

Next, outer spoke members 22 are assembled in like manner as were inner spoke members 20 described above except each rounded portion 94 thereof will be placed over a tab portion 76 of hub member 16 and one spoke leg from each of adjacent outer spoke member 22 will pass through each slot 74 in a criss-cross pattern. Cap member 18 is then placed over outer spoke members 22 and hub member 16 with slots 84 provided in cap member 18 engaging legs 96 and 98 of outer spoke members 22. Screw fasteners 90 are then inserted through apertures 92 provided in center portion 60 and into threaded apertures 88 of protrusions 96. Protrusions 86 are of such a length as to be slightly spaced away from portion 60 of base member 12 when tab portions 72 engage flange portion 52 so as to insure a maximum clamping force is exerted on the spoke members. As screw fasteners 90 are tightened, cap member 18 will be drawn axially toward base member 12 thereby causing hub member 16 to also be drawn toward base member 12. Therefore, when screw fasteners 90 have been fully tightened it is apparent that hub member 16 will be securely clamped between cap member 18 and base member 12. Further, the radially inner portions of inner spoke members 20 will be securely clamped between slots 70 and base member 12 and the radially inner portion of outer spoke members 22 will be clamped between the slots 74 and 84 provided in hub member 16 and cap member 18 respectively. Thus, the entire simulated wire wheel cover may be securely held together by a single ring of screw fasteners extending between base member 12 and cap member 18. It has been found that four screw fasteners are quite adequate to secure this wheel cover assembly and prevent the occurrence of any annoying rattling.

Referring now to FIG. 4, there is shown another embodiment of the present invention indicated generally at 108 and comprising a base member 110, a retention band 112 crimped or otherwise fastened to a radially extending flange portion 114 of base member 110 and having a plurality of retention teeth 116 provided thereon, a center hub member 118, inner spoke members 120, outer spoke members 122 and a cap member 124. Each of these members is substantially identical to the respective members described with reference to FIGS. 1 through 3 with the exception of hub member 118, and flange portion 114 of base member 110.

In this embodiment, hub member 118 is comprised of a center flange portion 126 extending generally in a radial direction and having a generally axially inwardly extending flange portion 128 extending from the radially outer edge thereof and a generally axially outwardly extending flange portion 130 extending from the radially inner edge thereof. Axially inwardly extending flange portion 128 is similar to flange portion 66 previously described having a plurality of slots 132 and tab portions 134 provided thereon adapted to receive and clamp inner spoke member 120 between hub member 118 and base member 110 similarly to that previously described with reference to FIGS. 1 and 3. However, in this case generally axially outwardly extending flange portion 130 is slightly conical in shape having a maximum diameter at the junction 136 with flange portion 126 and a minimum diameter at the axially outer terminal end thereof. This slightly conical shape imparted to flange portion 130 of hub member 118 is adapted to engage a similarly shaped conical radially inwardly and axially outwardly extending flange portion 138 provided on base member 110 thereby securely radially positioning center hub member 118 with respect to base member 110.

Cap member 124 is then fabricated with a mating conical shaped flange portion 140 extending radially outward and axially inward. As center hub member 118 is radially positioned by the mutual engagement between flanges 130 and 138, flange portion 140 has a diameter slightly greater than that of flange portion 130 so as to be slightly spaced apart therefrom thereby preventing any rattling or other noise generating vibrations from these members and also allowing cap member and center hub member to exert a greater clamping force on the radially inner ends of outer spoke members 122, thereby also insuring against any rattling or other noise generating vibrations emanating from these members.

Radially outwardly extending flange portion 114 of base member 110 is similar to that of flange portion 26 of base member 12 but is slightly narrower (approximately ½"). By thus merely increasing or decreasing the width of this flange portion, it is possible to manufacture wheel covers for various size wheels using identical components except for the retention band and base member thereby eliminating the need for separate tooling, jigs, and other forming apparatus to manufacture a variety of spoke lengths as well as reducing the inventory of different parts required, both factors of which substantially contribute to reducing manufacturing costs for such wheel covers.

Cap member 124 is also provided with slots 142 in flange portion 140 adapted to cooperate with slots 144 provided in flange portion 130 of hub member 118 to receive and clamp the radially inner end portions of outer spoke members 122, and axially inwardly extending protrusions 146 having threaded apertures 148 provided therein, all of which are substantially identical to respective portions of cap member 18. Screw fasteners 150 extend through apertures 152 in base member 110 into apertures 148 thereby securing cap member 124 in position as well as clamping hub member 118 and inner and outer spoke members 120 and 122 respectively in like manner as previously described.

Another embodiment of a simulated wire wheel cover in accordance with the present invention is illustrated in FIG. 5 and indicated generally at 154. Wheel cover 154 is similarly comprised of a base member 156 having a generally radially extending flange portion 158, the peripheral edge of which is secured to a retention band 160 such as by crimping or the like. Retention band 160 also has a plurality of tooth-like projections 162 extending radially outward therefrom adapted to engage an axially outwardly extending portion of a vehicle wheel.

Base member 156 also has a generally radially extending annular flange portion 164 disposed inboard from flange portion 158 with an indentation 166 provided therein and a raised central portion 168 all of which is similar to that described with reference to wheel covers 10 and 108.

A center hub member 170 having a slightly different cross sectional contour from those previously described but still including a generally radially and axially extending center flange portion 172, an axially inward extending flange portion 174, and an axially outwardly extending flange portion 176 is positioned over raised central portion 168. Both axially inwardly and axially outwardly extending flange portions 174 and 176 are provided with a plurality of slots 178 and 180 respectively adapted to receive inner and outer spoke members 182 and 184 respectively. Tab portions 186 separate adjacent slots 178 on flange portion 174 and tab portions 188 separate adjacent slots 180 on flange portion 176.

A cap member 190 having an axially inwardly extending annular flange portion 192 of a diameter slightly greater than the diameter of flange portion 176 is disposed over hub member 170 and is secured in clamping relationship thereto by a single ring of screw fasteners 194 passing through apertures 196 in base member 156 and engaging threaded apertures 198 provided in axially inwardly extending protrusions 200 provided on cap member 190 all similar to that previously described.

In this particular embodiment, however, flange portion 192 of cap member 190 is not provided with slots for receiving outer spoke members 184, but rather has a continuous edge portion 202 which engages spoke members 184 thereby clamping them in slots 180 provided in flange portion 176 of hub member 170. Accordingly, slots 180 are formed sightly deeper than the corresponding slots 76 and 144 of the previous embodiments. Axially outwardly projecting tab portions 188 will engage the inner edge of flange portion 192 thereby positioning cap member 190 with respect to hub member 170.

Also, as is apparent from FIG. 5, hub member 170 is formed in such a manner as to insure the inner surface thereof is spaced away from base member 156. In this embodiment tab portions 186 of hub member 170 are adapted to fit into indentation 166 provided in base member 156 thereby radially positioning hub member 170 with respect to base member 156. Spoke members 182 and 184 are clamped in position in an otherwise identical manner to that previously described.

Referring now to FIGS. 6 and 7, there is illustrated yet another embodiment of the present invention indicated generally at 203. Wheel cover 203 is similar to wheel covers 10, 108, and 154 having a multiflanged base member 204 with a retention band 206 secured to the peripheral edge 208 thereof, a generally radially extending annular flange portion 210 and a raised central portion 212.

A center hub 214 is positioned over raised central portion 212 and includes a generally radially extending intermediate flange portion 215 from which generally axially inwardly and outwardly extending annular flange portions 216 and 218 respectively project. Flange portion 216 includes a plurality of alternating slots 220 and tab portion 222 similar to slots 70 and tabs 72 described above and flange portion 218 may be provided with a plurality of slots 224 and tabs 226 similar to slots 74 and tabs 76 illustrated in FIG. 2.

A cap member 228 is also provided which, while having a slightly different cross sectional shape, is substantially identical to cap members 18, 124, and 190 described above having an axially inwardly extending annular flange portion 230 adapted to overlie flange portion 218 of hub member 214 and a plurality of spaced axially inwardly extending protrusions 232. Flange portion 230 is also provided with a pluraity of alternating slots 234 and tabs 236 which are arranged so as to be aligned with respective slots 224 and tabs 226 provided on flange portion 218 of center hub 214.

A plurality of inner spoke members 238 project generally radially outward from between flange portion 216 of center hub 214 and flange portion 210 of base member 204 and a plurality of outer spoke members 240 project radially outward from between cap member 228 and flange portion 218 of center hub member 214. Spoke members 238 and 240 are securely clamped in position by the cooperative relationship of fasteners 242 extending between base member 204 and protrusions 232 of cap member 228 in substantially an identical manner as described above. However, in this embodiment each of the plurality of inner and outer spoke members 238 and 240 in addition to having a slightly different shape is fabricated from hollow tubing. The use of hollow tubing for spoke members 238 and 240 enables the weight of the wheel cover to be substantially reduced while still providing a realistic appearing simulated wire wheel cover. This weight reduction is extremely advantageous as an aid to improved fuel economy, as well as improved ride and handling performance in that the wheel coves are unsprung weight. Further, wheel cover weight reduction eases the stress placed upon retention means and may even allow reduction of the number or strength thereof. Also, the hollow spoke members are more flexible than the solid core type, and therefore are able to accommodate greater manufacturing tolerances as well as being particularly well suited for use in the disclosed construction wherein the radially inner portions of the spoke members are retained by a clamping relationship.

Thus, it is readily apparent that the present invention provides an improved construction for simulated wire wheel covers which substantially reduces the assembly time and associated costs, by providing an arrangement whereby a single ring of screw fasteners clamps the radially inner ends of two groups of spoke members in axially spaced apart positions. Additionally, as only a single ring of fasteners is necessary to secure the present invention, the need for additional threaded protrusions is eliminated as well as the extra fasteners all of which serves to reduce the total weight of the wheel cover, an important consideration as such weight is unsprung in a vehicle and thus increases inertial forces exerted on the vehicle suspension components. Also, further weight reduction is achieved through the provision of hollow spoke members. Further, the present invention will afford additional cost savings in the form of reducd inventory and material requirements as fewer parts are required for its fabrication and assembly. It should be noted also that while the present invention offers the opportunity to realize substantial manufacturing cost reductions as set forth above, this construction maintains a securely assembled, rattle-free, durable simulated wire wheel cover having a remarkably authentic and aesthetically pleasing appearance.

While it is, therefore, apparent that the preferred embodiments of the invention disclosed are well calculated to overcome the disadvantages of previous constructions as briefly set forth above, it will be appreciated that the invention is susceptible to modification, variation, and change without departing from the proper scope or fair meaning of the subjoined claims.

We claim:

1. A simulated wire wheel cover comprising:
a center hub member;
a circular base member of a diameter greater than said hub member engaging one end of said hub member;
a cap member engaging another end of said center hub member;
a first plurality of spoke members extending radially outward from between said center hub member and said base member;
a second plurality of spoke members extending radially outward from between said center hub member and said cap member, said first plurality of spoke members and said second plurality of spoke members each having radially outer ends engaging portions of said base member;
retention means secured to a peripheral edge of said base member and operative to retain said wheel trim on a vehicle wheel; and
a plurality of fasteners, each of said fasteners extending between and engaging said base member and said cap member so as to clamp said first plurality of spoke members between said hub member and said base member and said second plurality of spoke members between said hub member and said cap member.

2. A simulated wire wheel cover as set forth in claim 1 wherein at least one of said first and second plurality of spoke members are fabricated from hollow tubes.

3. A simulated wire wheel cover as set forth in claim 1 wherein said cap member has an axially inwardly extending annular flange portion adapted to fit over said another end of said center hub member.

4. A simulated wire wheel cover as set forth in claim 3 wherein said annular flange portion engages said second plurality of spoke members.

5. A simulated wire wheel cover as set forth in claim 4 wherein said flange portion of said cap member is conically shaped so as to radially position said center hub member.

6. A simulated wire wheel cover as set forth in claim 1 wherein said one end of said center hub member has a plurality of equally spaced apart slots provided therein, said first plurality of spoke members passing therethrough.

7. A simulated wire wheel cover as set forth in claim 6 wherein said another end of said center hub member has a plurality of equally spaced apart slots provided therein, said second plurality of spoke members passing therethrough.

8. A simulated wire wheel cover as set forth in claim 7 wherein said cap member has a plurality of slots spaced apart so as to cooperate with said slots provided in said another end of said center hub member to clamp said second plurality of spoke members.

9. A simulated wire wheel cover as set forth in claim 8 wherein each of said first and second plurality of spoke members have a pair of radially extending leg portions and a rounded radially inner end portion.

10. A simulated wire wheel cover as set forth in claim 9 wherein one leg portion of each of said first plurality of spoke members passes through each of said plurality of slots provided on said one edge of said center hub member.

11. A simulated wire wheel cover as set forth in claim 9 wherein one leg portion from each of two adjacent spoke members of said second plurality of spoke members pass through each of said plurality of slots provided on said another edge of said center hub member.

12. A simulated wire wheel cover as set forth in claim 1 wherein said base member has a flange portion for supporting the radially outer ends of said first and second pluralities of spoke members.

13. A simulated wire wheel cover as set forth in claim 1 wherein said base member has an axially outwardly extending annular flange portion, said center hub member having a portion engaging said flange portion so as to be radially positioned.

14. A simulated wire wheel cover as set forth in claim 1 wherein said base member has a radially extending annular flange portion, an axially inward annular indentation provided thereon, and said one end of said center hub member is disposed in said indentation so as to radially position said center hub member with respect to said base member.

15. A simulated wire wheel cover as set forth in claim 1 further comprising a plurality of axially inward extending protrusions on said cap member, a plurality of apertures provided in said base member, and said fasteners comprised of screws passing through said apertures and engaging said protrusions.

16. A simulated wire wheel cover comprising:
a center hub member having an axially inwardly extending annular flange portion and a radially inwardly spaced axially outwardly extending annular flange portion;
a first group of spoke members extending generally radially outward from said axially outwardly extending flange portion of said center hub member;
a second group of spoke members extending generally radially outward from said axially inwardly extending flange portion of said center hub member;
a circular base member, said base member having at least one portion adapted for supporting the radially outer ends of said first and second groups of spoke members;
a cap member engaging said axially outwardly extending flange portion of said center hub member;
a plurality of protrusions extending axially inwardly from said cap member toward said base member;
retention means secured to a peripheral edge of said base member and operative to retain said wheel trim on a vehicle wheel; and
a plurality of fasteners, each of said fasteners extending between and engaging said base member and said protrusions so as to exert a clamping force between said cap member and said axially outwardly extending flange portion of said center hub member thereby securing said first group of spoke members in position and to exert a clamping force between said base member and said axially inwardly extending flange portion of said center hub member thereby securing said second group of spoke members in position.

17. A simulated wire wheel cover as set forth in claim 16 wherein said fasteners lie along the circumference of a circle having a diameter less than a minimum diameter of said center hub member.

18. A simulated wire wheel cover as set forth in claim 17 wherein said fasteners are screws threadingly engaging said protrusions.

19. A simulated wire wheel cover as set forth in claim 17 wherein said cap member has an inclined axially inwardly extending annular flange portion adapted to engage said axially outwardly extending flange portion of said center hub member thereby radially positioning said center hub member.

20. A simulated wire wheel cover as set forth in claim 19 wherein said annular flange portion of said cap member and said axially outward extending flange portion of said center hub member are each provided with a plurality of cooperating spaced apart slots through which said first group of spoke members extend, said slots cooperating to clamp said first group of spoke members against radial and axial movement thereof.

21. A simulated wire wheel cover as set forth in claim 20 wherein said axially inward extending flange portion of said center hub member has a plurality of spaced apart slots through which said second group of spoke members pass and which cooperate with said base member to clamp said second group of spoke members against radial and axial movement thereof.

22. A simulated wire wheel cover as set forth in claim 17 wherein said base member has an axially outwardly extending annular flange provided thereon, a portion of said center hub member engaging said annular flange portion thereby radially positioning said center hub member relative to said base member.

23. A simulated wire wheel cover as set forth in claim 17 wherein said base member has a radially extending annular flange portion with an axially inward indentation provided therein, said axially inwardly extending flange portion of said center hub member being disposed in said indentation and thereby being radially positioned relative to said base member.

24. A simulated wire wheel cover as set forth in claim 16 wherein said protrusions are of such a length as to be slightly spaced apart from said base member thereby insuring a maximum clamping force is exerted on said spoke member.

25. A simulated wire wheel cover as set forth in claim 16 wherein at least one of said first and second groups of spoke members are fabricated from hollow tubes.

* * * * *